United States Patent
Kojima et al.

(10) Patent No.: US 7,604,214 B2
(45) Date of Patent: Oct. 20, 2009

(54) SEAT SLIDE APPARATUS FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 134 days.

(21) Appl. No.: 11/841,263

(22) Filed: Aug. 20, 2007

(65) Prior Publication Data

US 2008/0048476 A1 Feb. 28, 2008

(30) Foreign Application Priority Data

Aug. 25, 2006 (JP) .............................. 2006-229260
Mar. 8, 2007 (JP) .............................. 2007-058518

(51) Int. Cl.
*F16M 13/00* (2006.01)

(52) U.S. Cl. ...................................... 248/430

(58) Field of Classification Search ................. 248/430, 248/429, 424; 297/341; 296/65.13, 65.14
See application file for complete search history.

(56) References Cited

U.S. PATENT DOCUMENTS 6,220,642 B1 * 4/2001 Ito et al. ................... 296/65.14
7,066,521 B2 * 6/2006 Jung et al. ................ 296/65.13
7,318,573 B2 * 1/2008 Yamada et al. .............. 248/424
7,328,877 B2 * 2/2008 Yamada et al. .............. 248/430

FOREIGN PATENT DOCUMENTS

| EP | 2 008 863 A1 | 12/2008 |
| JP | 2000-38064 | 2/2000 |
| JP | 2005-225415 | 8/2005 |
| WO | WO2007/129435 A1 | 11/2007 |

OTHER PUBLICATIONS

U.S. Appl. No. 11/837,913, filed Aug. 13, 2007, Kojima, et al.
U.S. Appl. No. 11/837,784, filed Aug. 13, 2007, Kojima, et al.

* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

A seat slide apparatus for a vehicle includes a lower rail, an upper rail, and a lock mechanism. The lock mechanism includes a lock portion provided at the lower rail, a lock member which is engageable with and disengageable from the lock portion and a first biasing member for biasing the lock member in a direction to be engaged with the lock portion. The seat slide apparatus for a vehicle further includes a releasing lever for releasing the lock member from being engaged with the lock portion and a second biasing member for maintaining the releasing lever at a neutral position. According to the seat slide apparatus for the vehicle, the first biasing member and the second biasing member are integrally formed.

12 Claims, 7 Drawing Sheets

SEAT SLIDE APPARATUS FOR VEHICLE

CROSS REFERENCE TO RELATED APPLICATIONS

This application is based on and claims priority under 35 U.S.C. § 119 with respect to Japanese Patent Application 2006-229260 filed on Aug. 25, 2006 and Japanese Patent Application 2007-058518 filed on Mar. 8, 2007, the entire content of which is incorporated herein by reference.

FIELD OF THE INVENTION

This invention relates to a seat slide apparatus for a vehicle, which operates a seat mounted on a vehicle to be movable by operating a handle.

BACKGROUND

A conventional seat slide apparatus for a vehicle is described in Japanese Patent No. 2005-225415 A (hereinafter, referred to as a reference 1). As illustrated in FIG. 1 of the reference 1, the seat slide apparatus for the vehicle includes a pair of lower rails, a pair of upper rails, a lock mechanism (a locking lever member), a releasing lever (opening bracket), a second biasing member (springs), and a handle (handle). The lower rails are secured to a vehicle floor, while the upper rails are secured to a vehicle seat and are longitudinally movably supported relative to the lower rails. The lock mechanism is provided at the lower rail and includes plural lock portions (lock bores), a lock member (a locking lever) and a first biasing member (a torsion spring). The lock portions (lock bores) are longitudinally provided at the lower rail and are arranged in line. The lock member (locking lever) is provided at the upper rail and is pivoted around a pivotal shaft line which extends in a longitudinal direction of the upper rail. Further, the lock member (locking lever) is engageable with and releasable from the lock portions (lock bores). The first biasing member (torsion spring) biases the lock member (locking lever) in a direction where the lock member (locking lever) is engaged with the lock portions (lock bores). The releasing lever (opening bracket) operates the lock member (locking lever) to be pivoted and releases the lock member (locking lever) from engaged with the lock portions (lock bores). Further, the second biasing member (spring) biases the releasing lever (opening bracket) in a direction where the lock member (locking lever) is to be engaged with the lock portions (lock bores). The handle (loop handle) is arranged to operate the releasing lever (opening bracket).

According to the seat slide apparatus for the vehicle described in the reference 1, the lock member (locking lever) is biased by the first biasing member (torsion spring) in a direction where the lock member (locking lever) is engaged with the lock portions (lock bores). Therefore, when the handle (loop handle) is not operated, the upper rail is locked to the lower rail. Further, the second biasing member (spring) biases the releasing lever (opening bracket) in a direction where the lock member (locking lever) is engaged with the lock portions (lock bores). Accordingly, when the vehicle is being driven, the releasing lever (opening bracket) does not repeat separating from nor connecting with the lock member (locking lever) and an unusual noise is prevented from being generated.

However, the conventional seat slide apparatus for the vehicle requires not only the first biasing member (torsion spring) but also the second biasing member (spring). Therefore, an amount of components is increased and furthermore, an assembling procedure is not facile.

A need thus exists for a seat slide apparatus for a vehicle which is not susceptible to the drawback mentioned above.

SUMMARY OF THE INVENTION

According to an aspect of the present invention, a seat slide apparatus for a vehicle includes a lower rail which is adapted to be fixedly mounted on a vehicle floor, an upper rail which is adapted to be coupled to a seat and supported on the lower rail so as to be movable in front and rear directions of the lower rail, and a lock mechanism which includes a lock portion, a lock member and a first biasing member. The lock portion is provided at the lower rail and the lock member is pivotably supported to the upper rail so as to be engageable with and disengageable from the lock portion. The first biasing member is provided for biasing the lock member in a direction to be engaged with the lock portion. The seat slide apparatus for the vehicle further includes a releasing lever for releasing the lock member from being engaged with the lock portion by pivoting the lock member, and a second biasing member which maintains the releasing lever and which is provided integral with the first biasing member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
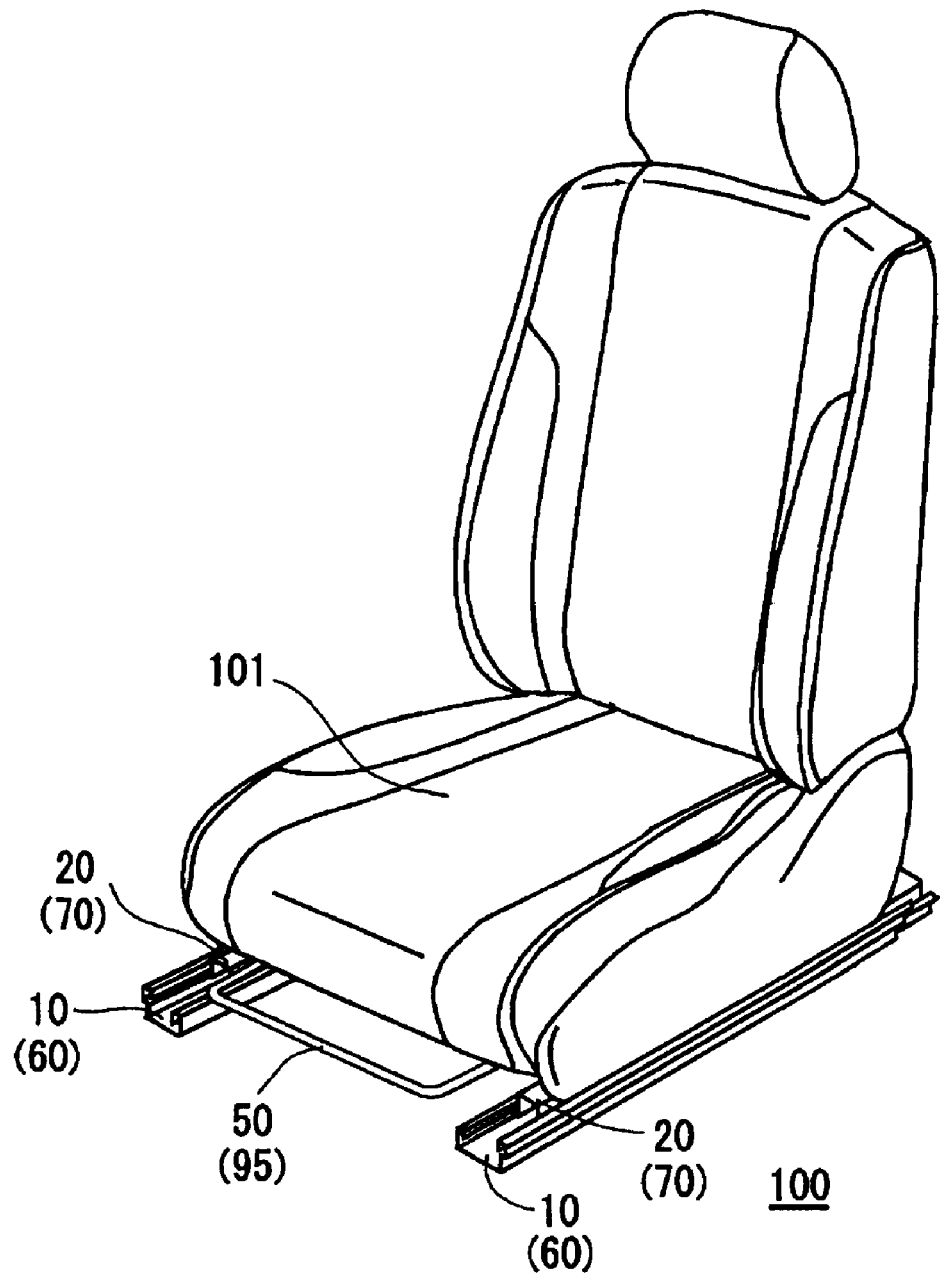
FIG. 1 is a perspective view illustrating a seat slide apparatus for a vehicle according to first to third embodiments.
Figure 2:
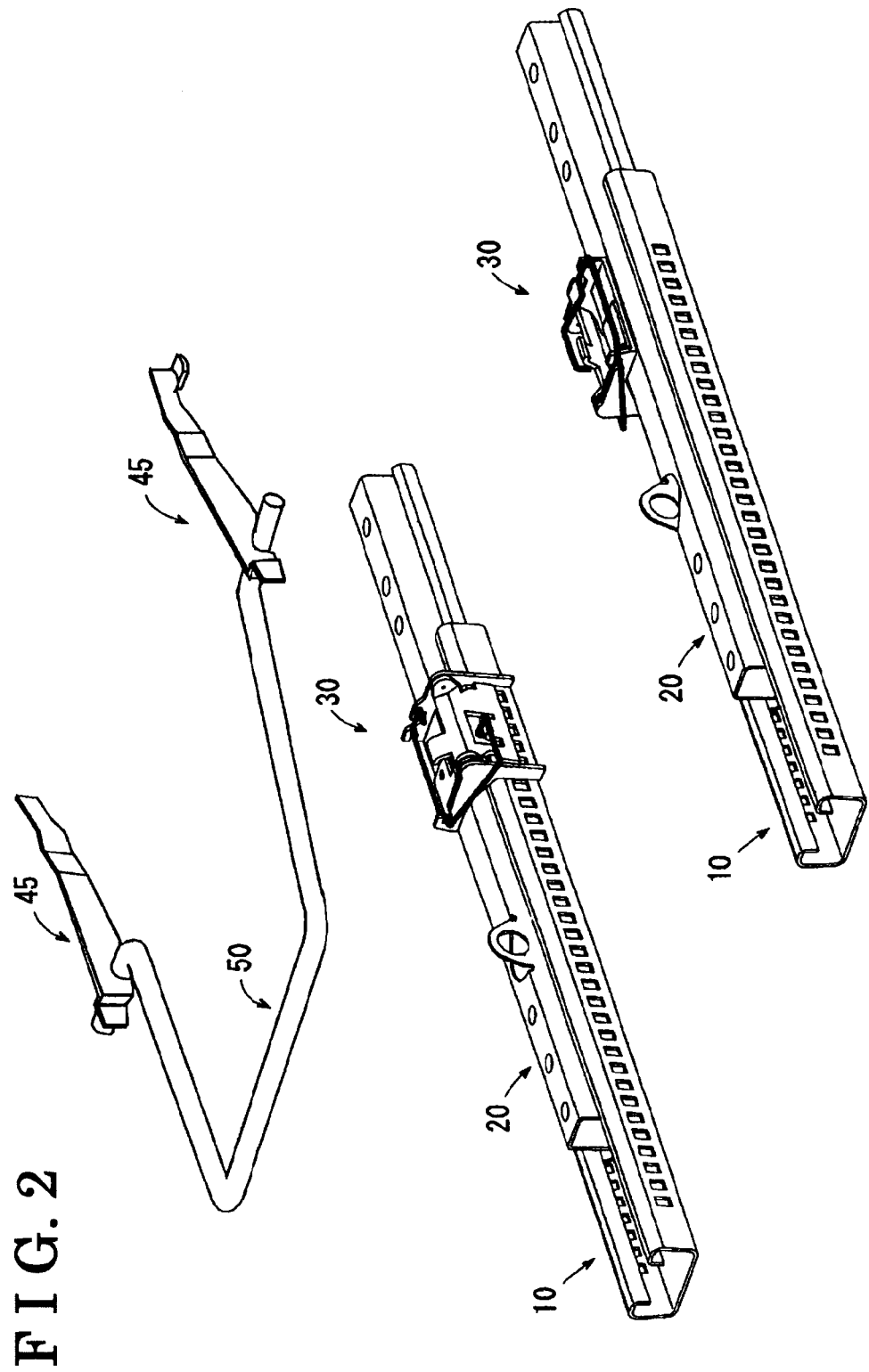
FIG. 2 is a perspective view illustrating a seat slide apparatus for a vehicle according to the first embodiment.

First to third embodiments of a seat slide apparatus according to the present invention will be described hereinbelow with reference to attached drawings. As illustrated in FIGS. 1 and 2, the seat slide apparatus according to the first embodiment includes a pair of lower rails 10 (first and second lower rails), which is fixed to a floor 100 of a vehicle and is arranged in front and rear direction thereof, and a pair of upper rails 20 (including first and second upper rails), which is secured to a seat 101 of the vehicle and movably supported relative to the pair of lower rails 10. The seat slide apparatus according to the first embodiment further includes a pair of lock mechanisms 30 for releasably locking the upper rails 20 relative to the lower rails 10, and a handle 50 for operating releasing levers 45 for unlocking the upper rails 20 relative to the lower rails 10. The releasing levers 45 are fixedly welded to the handle 50. FIG. 1 illustrates a perspective view of a seat mounted on a vehicle. FIG. 2 is a perspective view illustrating the pair of lower rails 10, the pair of upper rails 20 provided with the lock mechanisms 30 respectively, and the handle 50 fixedly provided with the releasing levers 45. Directions, such as "longitudinal", "lateral" and "vertical", which are mentioned herein, correspond to an orientation of the seat slide apparatus of a vehicle.

Figure 3:
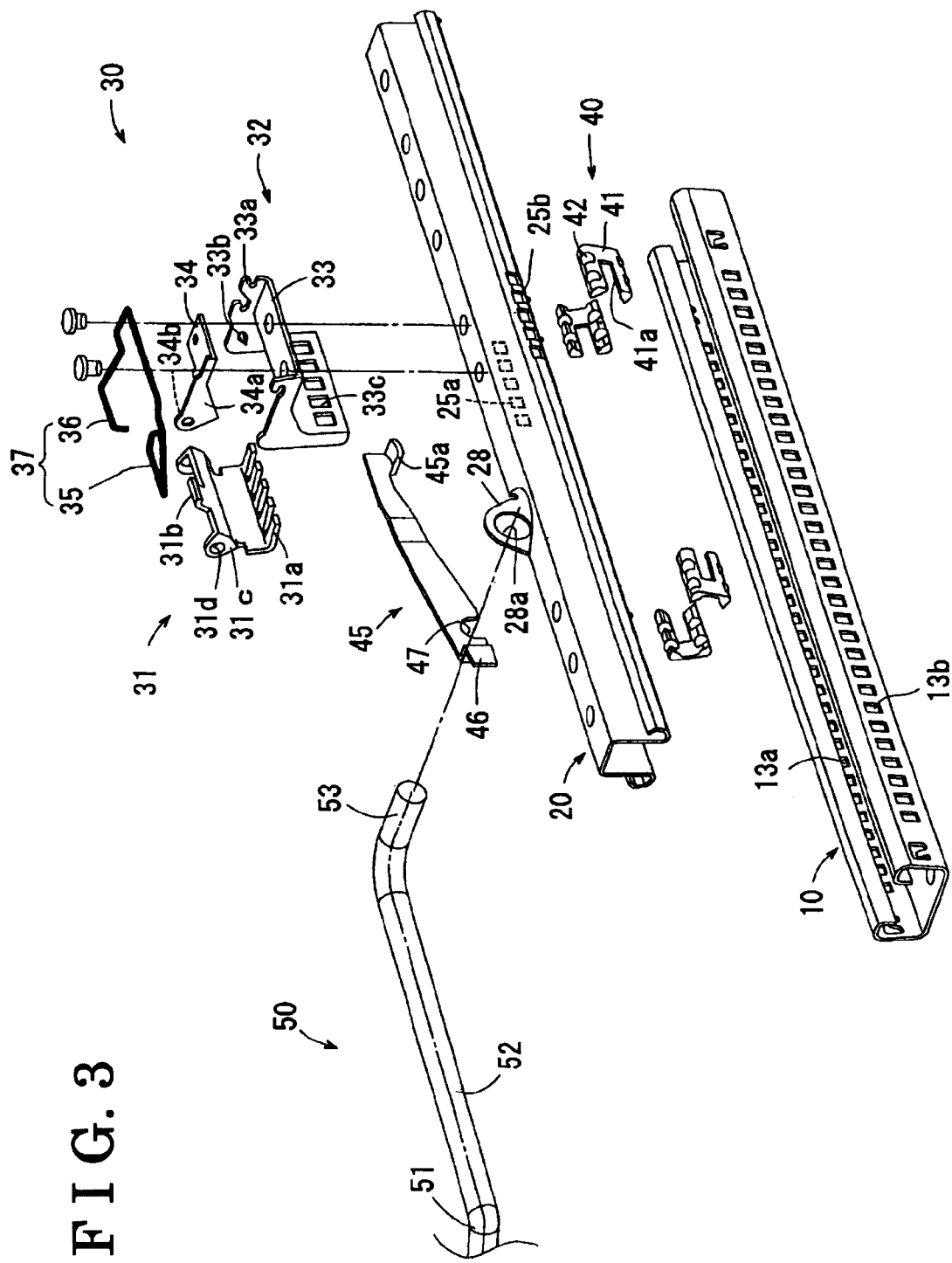
FIG. 3 is an exploded perspective view illustrating a pair of lower and upper rails according to the first embodiment.
Figure 4:
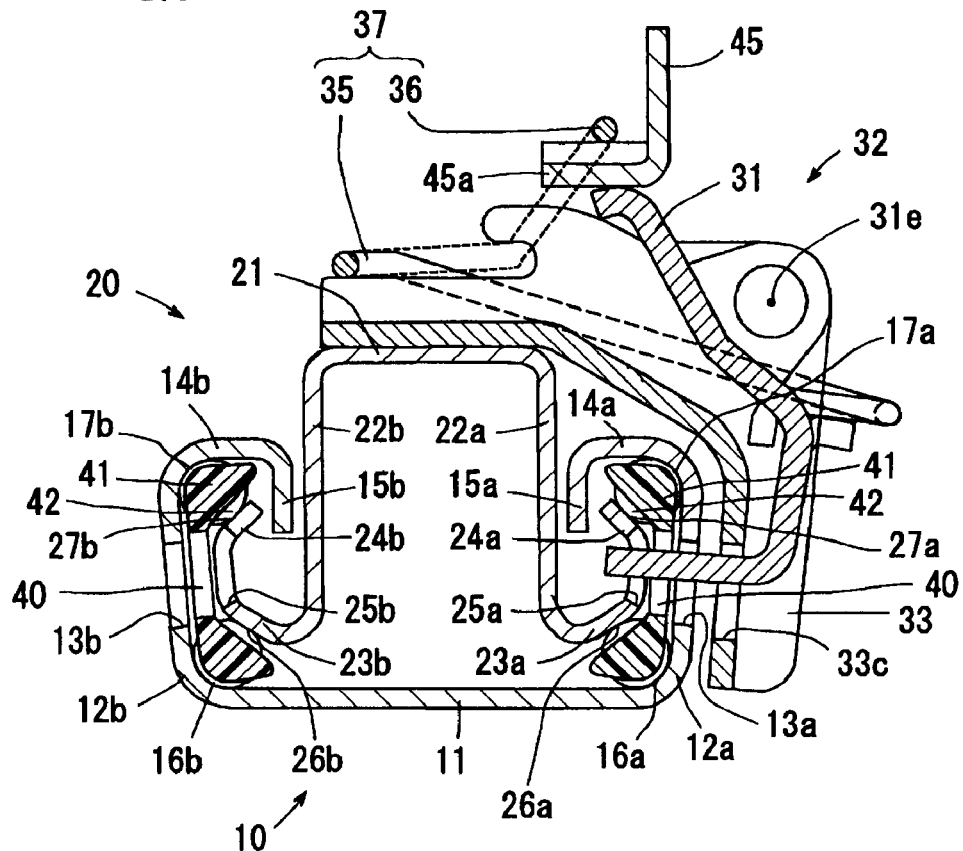
FIG. 4 illustrates a cross-sectional view illustrating the pair of lower and upper rails according to the first embodiment.

Next, components of the seat slide apparatus for the vehicle according to the first embodiment is described hereinafter in detail. The left side of the seat slide apparatus possesses the same components and functions as the right side thereof. Although the following description is about the left side of the seat slide apparatus in order to simplify the description, the description is also applicable to the right side of the seat slide apparatus. As illustrated in FIGS. 3 and 4, plural lock bores 13a and 13b are provided at the lower rail 10 along a longitudinal direction thereof. The lower rail 10 includes a bottom wall 11, an inner first sidewall 12a, an outer first sidewall 12b, upper walls 14a, 14b and second sidewalls 15a and 15b. The bottom wall 11 is provided in parallel to the floor 100 of the vehicle. The inner and outer first sidewalls 12a and 12b upwardly extend from lateral ends of the bottom wall 11, respectively. The upper walls 14a and 14b inwardly extend from upper ends of the first sidewalls 12a and 12b respectively, and the second sidewalls 15a and 15b downwardly extend from inner ends of the upper walls 14a and 14b, respectively. The lock bores 13a are provided at the inner first sidewall 12a while the lock bores 13b are provided at the outer first sidewall 12b, of the lower rail 10. The plural lock bores 13a provided at the inner first sidewall 12a serve as a lock portion. However, as described above, the lower rail 10 is further provided with the plural lock bores 13b so that an identical configuration is employed as the left lower rail 10 and the right lower rail 10. A sliding portion 16a is formed between the bottom wall 11 and the inner first sidewall 12a, and a sliding portion 17a is formed between the inner first sidewall 12a and the upper wall 14a. On the opposite side, a sliding portion 16b is formed between the bottom wall 11 and the outer first sidewall 12b, and a sliding portion 17b is formed between the outer first sidewall 12b and the upper wall 14b. The sliding portions 16a, 16b, 17a, 17b are in contact with balls 42 of sliding retaining members 40, which will all be described later. The lock bores 13a are provided between the sliding portions 16a and 17a, while the lock bores 13b are provided between the sliding portions 16b and 17b.

The upper rail 20 includes an upper wall 21, an inner drooped portion 22a, an outer drooped portion 22b, connecting portions 23a and 23b, an inner upward portion 24a and an outer upward portion 24b. The upper wall 21 is arranged in parallel to the floor 100 of the vehicle. The inner and outer drooped portions 22a and 22b downwardly extend from lateral ends of the upper wall 21, respectively. The connecting portions 23a and 23b outwardly extend from lower portions of the drooped portions 22a and 22b respectively, and the inner and outer upward portions 24a and 24b upwardly extend from outer end portions of the connecting portions 23a and 23b, respectively. The inner upward portion 24a is provided with through-bores 25a which are adapted to face the lock bores 13a of the inner first side wall 12a, while the outer upward portion 24b is provided with through-bores 25b which face the lock bores 13b of the outer first sidewall 12b. The connecting portions 23a and 23b are formed with sliding portions 26a and 26b, respectively. Further, edge portions of the upward portions 24a and 24b are formed with sliding portions 27a and 27b, respectively. The sliding portions 26a, 26b, 27a and 27b are in contact with the balls 42 of the sliding retaining members 40 respectively, which will all be described later. Going back to FIG. 3, a bearing portion 28 is formed or provided at an outer surface of the upper wall 21 of the upper rail 20. The bearing portion 28 is positioned at a slightly forward direction from a center portion of the upper rail 20 and is pierced with a retaining hole 28a. A pivotal shaft 53 of the handle 50 is pivotally supported at the bearing portion 28.

The sliding retaining members 40 are provided between the lower rail 10 and the upper rail 20 so as to slidably retain the lower rail 10 with the upper rail 20. One pair of the lower rail 10 and the upper rail 20 includes four sliding retaining members 40. Two sliding retaining members 40 are arranged in each front and rear portion of the inner first sidewall 12a of the lower rail 10, respectively, being in contact with the sliding portions 16a, 17a, 26a and 27a. Meanwhile, the other two sliding retaining members 40 are arranged in each front and rear portion of the outer first sidewall 12b of the lower rail 10, respectively, being in contact with the sliding portions 16b, 17b, 26b and 27b. Each sliding retaining member 40 includes a resin-made retainer 41, and the balls 42 which are rotatably supported by the retainer 41. The retainer 41 is formed with a recessed portion 41a.

The lock mechanism 30 includes the lock bores 13a as a lock portion, a locking lever 31 as a lock member, a bracket 32 and a first engagement spring 35 (serving as a first biasing member) of a spring 37. The spring 37 at the left side serves as a first spring, while the spring 37 at the right side serves as a second spring. Lock nails 31a are provided at a lower portion of the locking lever 31 so as to be engageable with and releasable from the lock bores 13a. Further, an interlocking portion 31b is provided at an upper portion of the locking lever 31. The interlocking portion 31b is engaged with a pressing portion 45a of the releasing lever 45 which pivotally operates the locking lever 31. Both front and rear ends of the locking lever 31 are integrally provided with pivot plates 31c, respectively. Each pivot plate 31c is supported by the bracket 32 and is formed with a concave portion 31d, which includes a hemispherical concave surface.

The bracket 32 includes a first bracket 33 and a second bracket 34. The bracket 32 is fixedly attached to the upper wall 21 of the upper rail 20 above the lower rail 10 and extends along an outer surface of the inner first sidewall 12a of the lower rail 10. A supporting plate 33a is integrally provided at a rear end portion of the first bracket 33 and a supporting plate 34a is integrally provided at a front end portion of the second bracket 34, in order to support the locking lever 31. The supporting plates 33a and 34a are formed with protruding portions 33b and 34b, respectively, in a manner where the protruding portions 33b and 34b face the concave portions 31d of the pivot plate 31c respectively. Accordingly, the protruding portions 33b and 34b are inserted into the concave portions 31d and therefore, the locking lever 31 is pivotally supported by the bracket 32 around a pivotal axis 31e which extends in a longitudinal direction of the upper rail 20. Further, through-bores 33c are provided at a lower portion of the first bracket 33. The through-bores 33c are adapted to face the lock bores 13a formed at the inner first sidewall 12a of the lower rail 10. The lock nails 31a of the locking lever 31 are penetrated through the through-bores 25a and 33c, and are engaged with the lock bores 13a.

The handle 50 is formed by bending a pipe member and includes a holding portion 51, a pair of arm portions 52 and a pair of pivotal shafts 53. The holding portion 51 extends in a lateral direction of the seat slide apparatus for the vehicle, i.e., perpendicularly extends relative to a longitudinal direction of the upper rail 20. The arm portions 52 are formed by approximately perpendicularly bending lateral ends of the holding portion 51, respectively, and are arranged to be parallel to each other. The pivotal shafts 53 are formed by bending base portions of the arm portions 52, respectively, and laterally extend to be away from each other. Further, the pivotal shafts 53 are axially pivotably supported by the retaining holes 28a, respectively, which are pierced at the bearing portions 28 of the upper rails 20.

A shape of the releasing lever 45 is represented by a plate shape which extends in the longitudinal direction of the upper rail 20. A stopper 46 is integrally provided at a front portion of the releasing lever 45 in order to restrain a position of the releasing lever 45 adapted to move away from the locking lever 31. A fixing bore 47 is formed at the front portion of the releasing lever 45 while the pressing portion 45a is provided at a rear portion of the releasing lever 45 so as to horizontally protrude in an outer direction of the seat slide apparatus for the vehicle. Each pivotal shaft 53 of the handle 50 is inserted into the fixing bore 47 and welded thereto. Therefore, the releasing lever 45 is fixedly attached to the handle 50. The pressing portion 45a is biased by a second engagement spring 36 of the spring 37 so as to make a contact with the interlocking portion 31b of the locking lever 31. According to the first embodiment of the present invention, the handle 50 and the releasing levers 45 are separately formed. However, the handle 50 and the releasing levers 45 may be integrally formed.

The spring 37 includes the first engagement spring 35 and the second engagement spring 36, both which are integrally formed. The first engagement spring 35 serves as first biasing member and the second engagement spring 36 serves as second biasing member. The spring 37 is supported by the locking lever 31 and the bracket 32. An end of the spring 37 (i.e., an end of the first engagement spring 35) is operably connected to the locking lever 31 while the other end of the spring 37 (i.e., an end of the second engagement spring 36) is operably connected to the releasing lever 45. Accordingly, the first engagement spring 35 biases the locking lever 31 to a direction where the lock nails 31a of the locking lever 31 are engaged with the lock bores 13a. The second engagement spring 36 biases the pressing portion 45a of the locking lever 45 in a direction where the pressing portion 45a of the releasing lever 45 makes a contact with the interlocking portion 31b of the locking lever 31. The biasing force of the second engagement spring 36 is smaller than that of the first engagement spring 35. In the above-described condition, a position, where the pressing portion 45a is in contact with the interlocking portion 31b of the locking lever 31, is assigned as a neutral position.

Next, an operation of the seat slide apparatus for the vehicle will be briefly described hereinbelow. A biasing force of the first engagement spring 35 of each left and right lock mechanism 30 is larger than a biasing force of the second engagement spring 36 of the corresponding lock mechanism 30. Therefore, when the handle 50 is not operated, the lock nails 31a of each locking lever 31 are engaged with the lock bores 13a formed at each lower rail 10, and the upper rail 20 is locked to the corresponding lower rail 10. In the mean time, the releasing lever 45 is maintained to be located at the neutral position where the pressing portion 45a provided at the releasing lever 45 is in contact with the interlocking portion 31b formed at the locking lever 31.

When an operator (i.e., in this case, a vehicle occupant) pulls the handle 50 up, the pivotal shafts 53 of the handle 50 rotate around the retaining holes 28a pierced at the bearing portions 28, respectively, as pivot axis. Then, each releasing lever 45, which is fixed to the corresponding pivotal shaft 53, rotates against the biasing force of the corresponding first engagement spring 35. Therefore, the interlocking portion 31b of each locking lever 31 is pressed by the pressing portion 45a of the releasing lever 45. Then, the locking lever 31 is rotated around the pivotal axis 31e, and the lock nails 31a of each locking lever 31 are released from engaging with the lock bores 13a formed at each lower rails 10. Accordingly, the upper rails 20 are operated to be longitudinally movable.

When the operator releases the handle 50, the lock nails 31a of each locking lever 31 are engaged with the lock bores 13a of the corresponding lower rail 10 by the biasing force of the first engagement spring 35. Therefore, the upper rail 20 is locked to the corresponding lower rail 10 again. When force to lower the handle 50 is applied thereto, the stoppers 46 of the releasing levers 45 make a contact with the upper walls 21 of the upper rails 20, respectively. Therefore, the releasing levers 45 are restrained from rotating in a direction to move away from the locking levers 31.

According to the first embodiment of the seat slide apparatus for the vehicle, the first engagement spring 35 and the second engagement spring 36 are integrally formed. Therefore, there is no need to separately provide the first engagement spring 35 and the second engagement spring 36. Further, members for locking the first engagement spring 35 and the second engagement spring 36 are not necessary and an assembling procedure may be facilitated. Consequently, according to the first embodiment of the seat slide apparatus for the vehicle, an amount of components is reduced and the assembling procedure may be facilitated.

Further, according to the first embodiment of the seat slide apparatus for the vehicle, the biasing force of the second engagement spring 36 is smaller than the biasing force of the first engagement spring 35. Therefore, force applied to bias the locking lever 31 in a direction where the lock nails 31a are engaged with the lock bores 13a of the lower rail 10 is greater than a force applied to bias the locking lever 31 in a direction where the lock nails 31a of the locking lever 31 are released from the lock bores 13a of the lower rail 10. Accordingly, the lock bores 13a of the lower rail 10 and the locking lever 31 are tightly engaged with each other.

Still further, according to the first embodiment of the seat slide apparatus for the vehicle, the stopper 46 is integrally provided at the front portion of the releasing lever 45 in order to restrain a position of the releasing lever 45 adapted to move away from the locking lever 31. Accordingly, because of this simplified structure, the pressing portion 45a of the releasing lever 45 is prevented from largely moving away from the locking lever 31 and therefore, the second engagement spring 36 is protected from being removed or being damaged.

Next, the second embodiment of the seat slide apparatus for the vehicle is described hereinbelow with reference to attached drawings. Mechanical components of the seat slide apparatus for the vehicle used in the same manner as the first embodiment are denoted with the same reference numerals and a description about such mechanical components is omitted herein.

Figure 5:
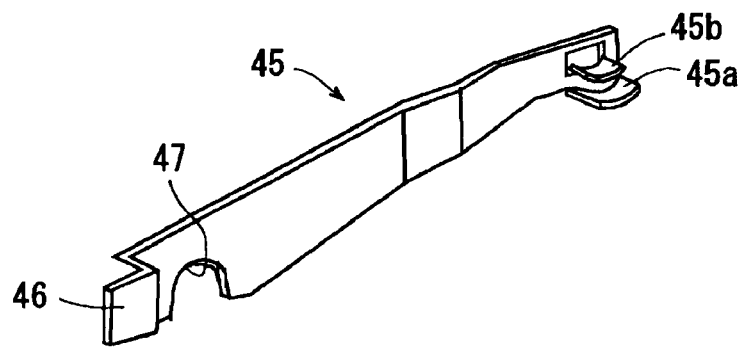
FIG. 5 illustrates a perspective view illustrating a releasing lever according to the second embodiment.
Figure 6:
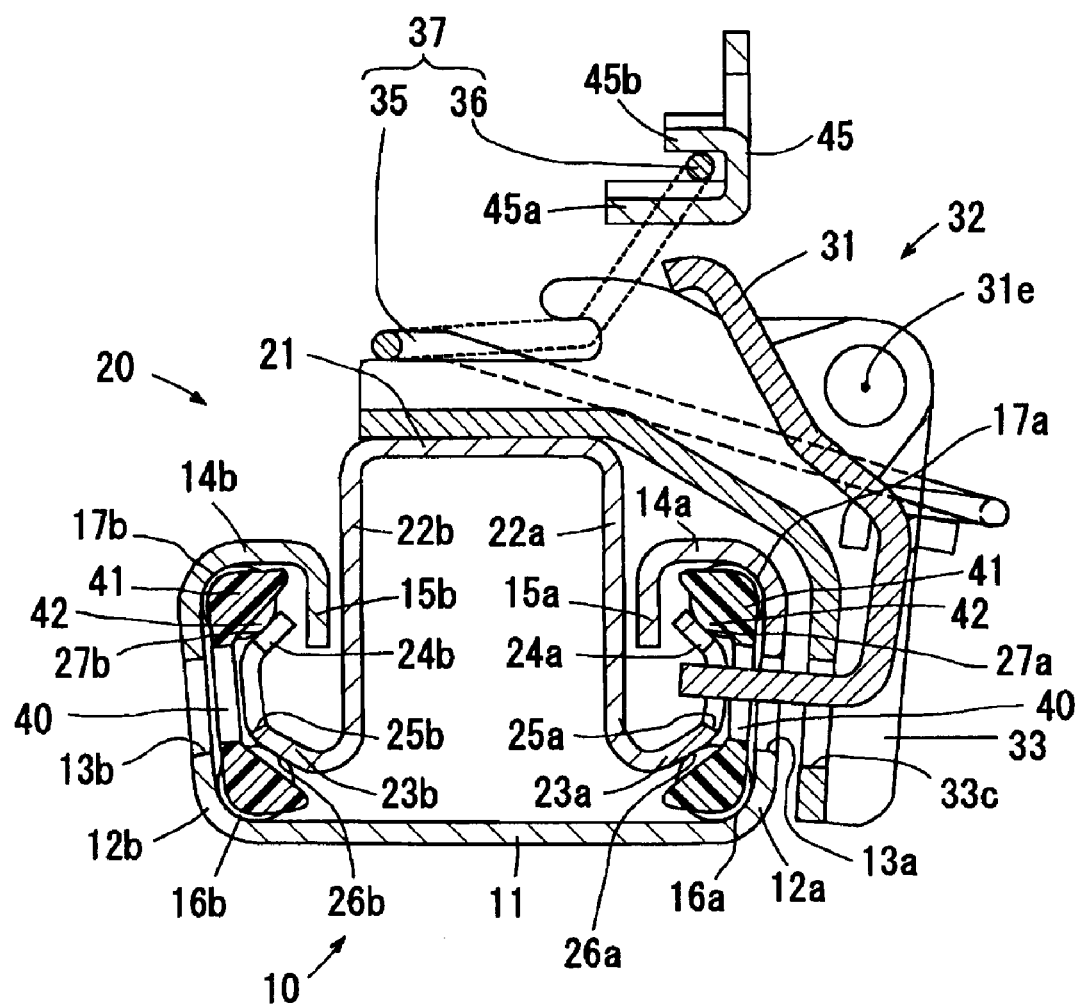
FIG. 6 illustrates a cross-sectional view illustrating a pair of lower and upper rails according to the third embodiment.

As illustrated in FIGS. 5 and 6, the seat slide apparatus for the vehicle according to the second embodiment includes the releasing lever 45, which is formed with a locking portion 45b. The locking portion 45b is formed above the pressing portion 45a by cutting the rear portion of the releasing lever 45 and bending therewith, so as to horizontally protrude in an outer direction of the seat slide apparatus for the vehicle. The second engagement spring 36 of the spring 37 is inserted between the pressing portion 45a and the locking portion 45b. The spring 37 is integrally formed of the first engagement spring 35 and the second engagement spring 36. The first engagement spring 35 biases the locking lever 31 in a direction where the lock nails 31a of the locking lever 31 are engaged into the lock bores 13a of the lower rail 10. The second engagement spring 36 biases the locking portion 45b of the releasing lever 45 in a direction where the pressing portion 45 of the releasing lever 45 are moved away from the interlocking portion 31b of the locking lever 31. Further, the biasing force of the second engagement spring 36 is smaller than the biasing force of the first engagement spring 35. In the above described condition, the releasing lever 45 is maintained to be located at a neutral position where the stopper 46 of the releasing lever 45 makes a contact with the outer surface of the upper wall 21 of the upper rail 20.

According to the second embodiment, the locking lever 31 is released from engaging with the lock bores 13a of the lower rail 10 by pulling the handle 50 up against the biasing force of the first and second engagement spring 35 and of second engagement spring 36. The biasing force of the second engagement spring 36 is smaller than the first engagement spring 35 and therefore, the handle 50 is operated with an adequate force. Other effectiveness and advantages according to the second embodiment are obtained herein in the same manner as in the first embodiment of the present invention.

Figure 7:
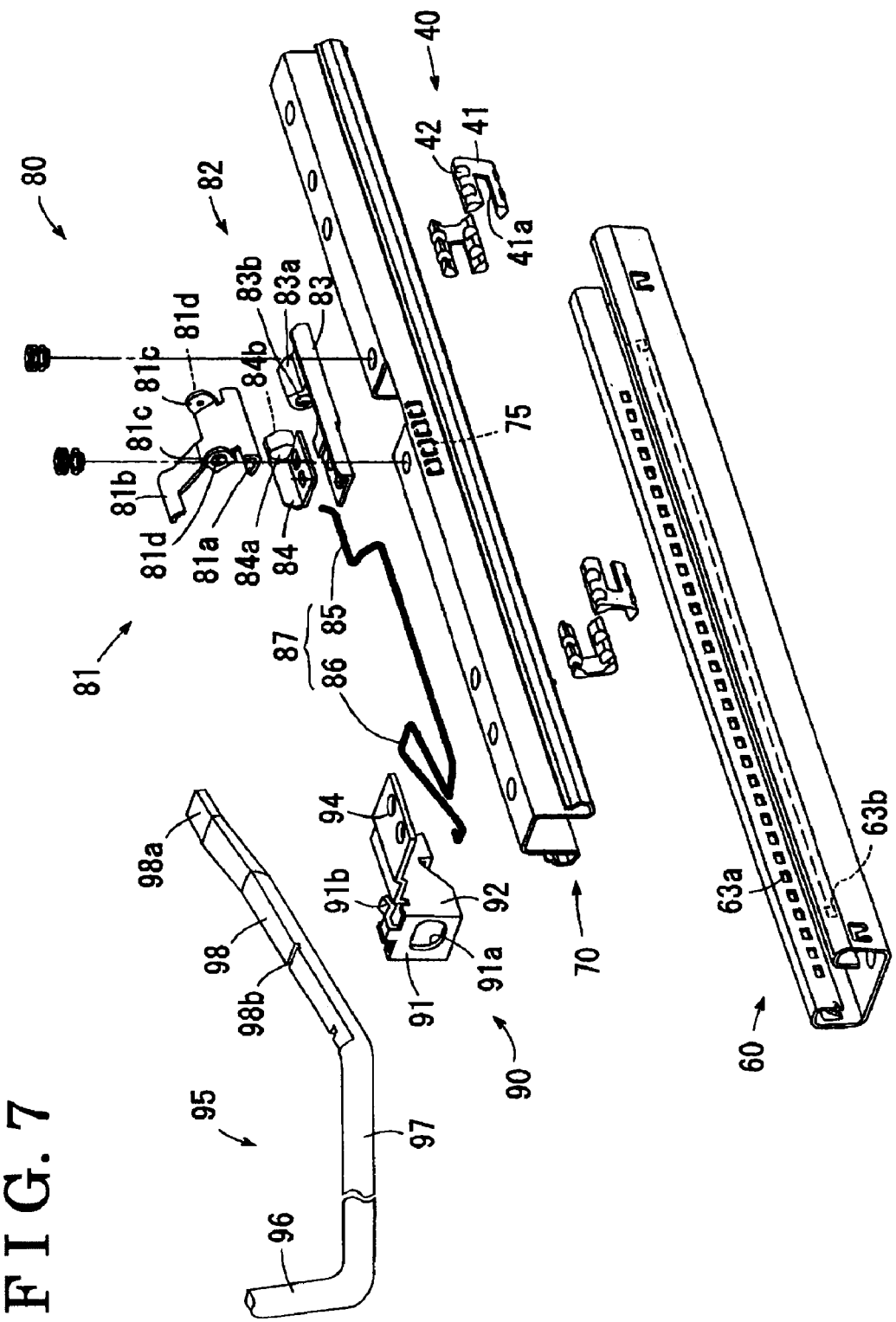
FIG. 7 is an exploded perspective view illustrating the pair of the lower and upper rails according to the third embodiment.

Next, the third embodiment of the present invention is described hereinbelow. As illustrated in FIG. 1, the seat slide apparatus for the vehicle according to the third embodiment includes a pair of lower rails 60 (first and second lower rails), and is fixed to the floor 100 and arranged in front and rear direction thereof, and a pair of upper rails 20 (first and second upper rails), and is secured to the seat 101 of the vehicle and movably supported relative to the pair of lower rails 10. The seat slide apparatus for the vehicle according to the third embodiment further includes a pair of lock mechanisms 80 (only left lock mechanism 80 is illustrated in FIG. 7) for releasably locking the upper rails 70 relative to the lower rails 10, and a handle 95 for releasing the upper rails 70 from being locked to the lower rails 60.

Figure 8:
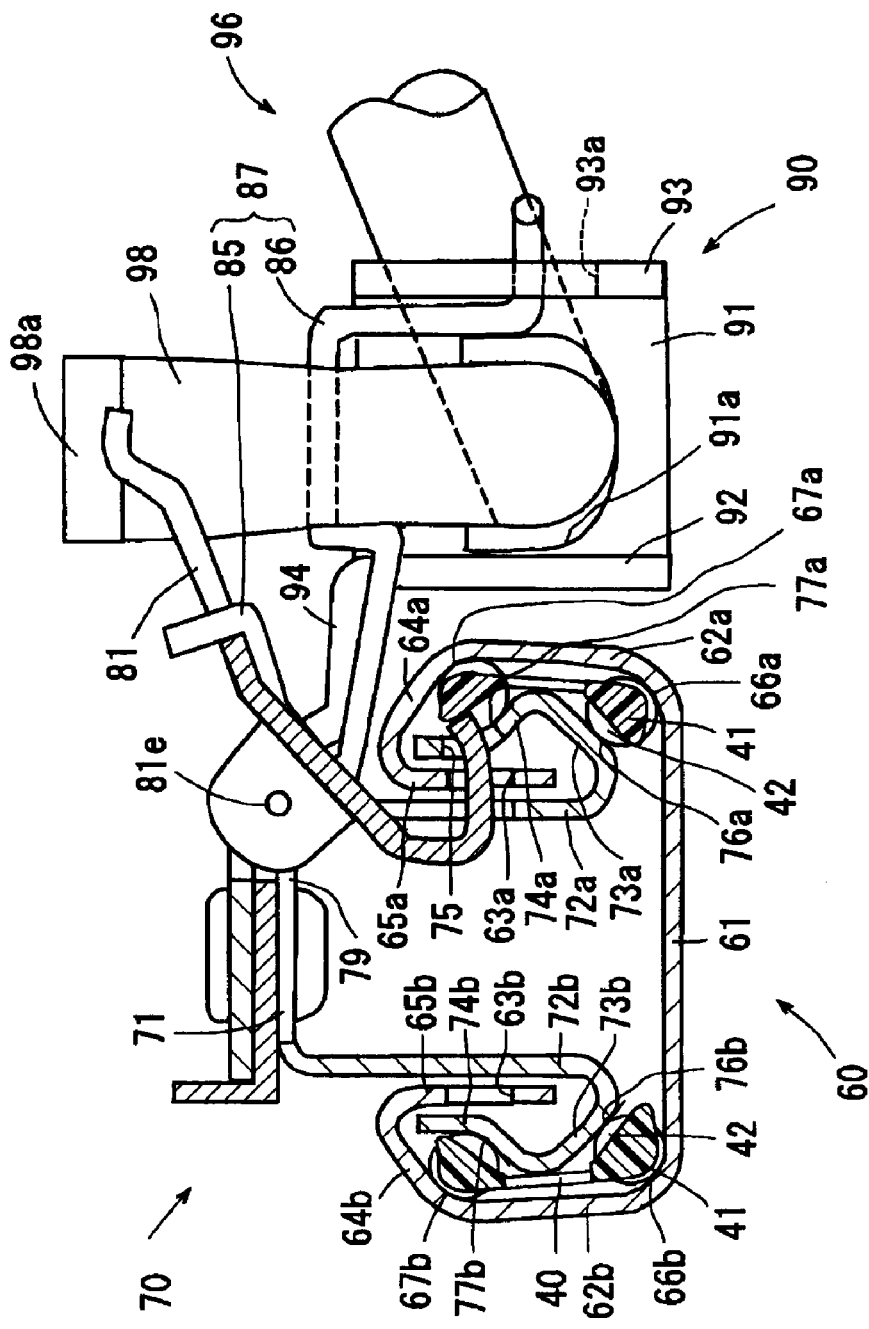
FIG. 8 is a cross-sectional view illustrating the pair of the lower and upper rails according to the third embodiment.

Next, components of the seat slide apparatus for the vehicle according to the third embodiment is described hereinafter in detail. The left side of the seat slide apparatus possesses the same components and functions as the right side thereof. Although the following description is about the left side of the seat slide apparatus in order to simplify the description, the description is also applicable to the right side of the seat slide apparatus. As illustrated in FIGS. 7 and 8, plural lock bores 63a and 63b are provided at the lower rail 60 along a longitudinal direction thereof. The lower rail 60 includes a bottom wall 61, an inner first sidewall 62a, an outer first sidewall 62b, upper portions 64a and 64b, an inner second sidewall 65a and an outer second sidewall 65b. The bottom wall 61 is provided in parallel to the floor 100 of the vehicle. The inner and outer first sidewalls 62a and 62b upwardly extend from lateral ends of the bottom wall 61, respectively. The upper portions 64a and 64b inwardly extend from upper ends of the first sidewalls 62a and 62b and upwardly incline, respectively. The inner and outer second sidewalls 65a and 65b downwardly extend from inner ends of the upper portions 64a and 64b, respectively. The lock bores 63a are provided at the inner second sidewall 65a while the lock bores 63b are provided at the outer second sidewall 65b, of the lower rail 60. In the third embodiment, the plural lock bores 63a provided at the inner first sidewall 62a serve as a lock portion. However, as described above, the lower rail 60 is provided with the plural lock bores 63a and 63b so that an identical configuration is employed as the left lower rail 60 and the right lower rail 60. A sliding portion 66a is formed between the bottom wall 61 and the inner first sidewall 62a, and a sliding portion 67a is formed between the first sidewall 62a and the upper portion 64a. On the opposite side, a sliding portion 66b is formed between the bottom wall 61 and the outer first sidewall 62b, and a sliding portion 67b is formed between the outer first sidewall 62b and the upper portion 64b. The sliding portions 66a, 66b, 67a, 67b are in contact with balls 42 of sliding retaining members 40, which will all be described later.

The upper rail 70 includes an upper wall 71, an inner drooped portion 72a, an outer drooped portion 72b, a pair of connecting portions 73a and 73b, an inner upward portion 74a and an outer upward portion 74b. The upper wall 71 is arranged in parallel to the floor 100 of the vehicle. The inner and outer drooped portions 72a and 72b downwardly extend from lateral ends of the upper wall 71, respectively. The connecting portions 73a and 73b outwardly extend from lower portions of the drooped portions 72a and 72b respectively, and the inner and outer upward portions 74a and 74b upwardly extend from outer end portions of the connecting portions 73a and 73b, respectively. A cutout hole 79 is provided at a longitudinal intermediate portion of the upper rail 70 and is provided over the upper rail 71 and the inner drooped portion 72a, of the upper rail 70. The inner upward portion 74a is provided with through-bores 75, which are adapted to face the lock bores 63a formed at the inner second sidewall 65a of the lower rail 60. The connecting portions 73a and 73b are formed with sliding portions 76a and 76b, respectively. Further, intermediate portions of upward portions 74a and 74b are formed with sliding portions 77a and 77b, respectively. The sliding portions 76a, 76b, 77a and 77b are in contact with the balls 42 of the sliding retaining members 40 respectively. The sliding retaining members 40 are provided between the lower rail 60 and the upper rail 60 so as to slidably retain the lower rail 60 with the upper rail 70, being in contact with the sliding portions 66a, 66b, 67a, 67b, 76a, 76b, 77a, and 77b. The sliding retaining members 40 in the third embodiment of the present invention are mechanically configured in the same manner as in the first and second embodiments. Accordingly, such mechanical components of the sliding retaining members 40 are denoted with the same reference numerals used in the first and second embodiments, and a description about such mechanical components of the sliding retaining members 40 will be omitted herein.

The lock mechanism 80 includes the lock bores 63a as a lock portion, and a locking lever 81 as a lock member, a bracket 82, and a first engagement spring 85 (serving as the first biasing member) of a spring 87. The spring 87 at the left side serves as a first spring, while the spring 87 at the right side serves as a second spring. Lock nails 81a are provided at a lower portion of the locking lever 81 so as to be engageable with and releasable from the lock bores 63a formed at the inner second sidewall 65a of the lower rail 60. Further, an interlocking portion 81b is provided at an upper portion of the locking lever 81. The interlocking portion 81b is engaged with a pressing portion 98a of the handle 95, which pivotally operate the locking lever 81. Both front and rear ends of the locking lever 81 are integrally provided with pivot plates 81c, respectively. Each pivot plate 81c is supported by the bracket 82 and is formed with a concave portion 81d, which includes a hemispherical concave surface.

The bracket 82 includes a first bracket 83 and a second bracket 84. The bracket 82 is fixedly attached to the upper wall 71 of the upper rail 70 above the lower rail 60. A supporting portions 83a is integrally provided at a rear end portion of the first bracket 83 and a supporting portion 84a is integrally provided at a front end portion of the second bracket 84, in order to support the locking lever 81. Each supporting plate 83a is formed with a protruding portion 83b and each supporting plate 84a is formed with a protruding portion 84b, respectively. The protruding portions 83a and 84b face the concave portions 81d of the pivot plate 81c so that the protruding portions 83a and 84b are inserted into the concave portions 81d. Because the protruding portions 83b and 84b are inserted into the concave portions 81d, the locking lever 81 is pivotably supported by the bracket 82 around a pivotal axis 81e which extends in a longitudinal direction of the upper rail 70. When each upper rail 70 is locked to each lower rail 60, the lock nails 81a of each locking lever 81 are engaged into the lock bores 63a formed at the inner second sidewall 65a of each lower rail 60 and are penetrated through the through-bores 75 provided at the inner upward portion 74a of the upper rail 70.

The handle 95 is formed by bending a pipe member and includes a holding portion 96, a pair of arm portions 97 and a pair of lever portions 98. The holding portion 96 extends in a lateral direction of the seat slide apparatus for the vehicle, i.e., extends perpendicularly relative to a longitudinal direction of the upper rail 70. The arm portions 97 are formed by approximately perpendicularly bending lateral ends of the holding portion 51, respectively, and are arranged to be parallel to each other. The lever portions 98 are formed as edge portions of the arm portions 97 and upper portions of the lever portions 98 are formed in plane shape, respectively. Edge portions of the lever portions 98 are formed with pressing portions 98a, respectively, which are engaged with the interlocking portions 81b of the locking levers 81 and which pivotally operate the locking levers 81. Further, inserting grooves 98b are formed at around intermediate portions of the lever portions 98, respectively. A second engagement spring 86, which will be described later, of the spring 87 is inserted into each inserting groove 98b of the lever portion 98, respectively.

The handle 95 is operably supported by a pair of handle attaching member 90. It is to be understood that both handle attaching member 90 possess the same general configuration so that the description below applies to both handle attaching members 90, though only the left handle attaching member 90 is described hereinafter. The handle attaching member 90 includes a retaining plate 91, a pair of side plates 92 and 93, and an attaching plate 94. A shape of the retaining plate 91 is approximately square shape and the retaining plate 91 is arranged perpendicularly to the longitudinal direction of the upper rail 70. The side plates 92 and 93 extend in parallel to the longitudinal direction of the upper rail 70 and a shape of each side plate 92 and 93 is approximately rectangular shape. The attaching plate 94 horizontally outwardly extends from a top hem of the side plate 92. The attaching plate 94 is fixedly attached to the upper wall 71 of the upper rail 70 by welding or by caulking, and the handle attaching member 90 is attached to the upper rail 70 longitudinally in parallel thereto. A retaining hole 91a is pierced at a center portion of the retaining plate 91 and the lever portion 98 of the handle 95 is inserted into the retaining hole 91a. A stopper 91b is approximately horizontally provided at a top hem of the retaining plate 91. Further, the side plate 93 is pierced with a locking hole 93a at which an edge of the below-described second engagement spring 86 is operably connected.

The spring 87 is integrally formed with the first engagement spring 85 and the second engagement spring 86. The first engagement spring 85 serves as a first biasing member while the second engagement spring 86 serves as a second biasing member and as a connecting member. The first engagement spring 85 biases the locking levers 81 to a direction where the lock nails 81a of the locking lever 80 are engaged with the lock bores 63a formed at the inner second sidewall 65a of the lower rail 60. The second engagement spring 86 biases the pressing portion 98a of the handle 95 in a direction where the pressing portion 98a makes a contact with the interlocking portion 81b of the locking lever 81. A biasing force of the second engagement spring 86 is smaller than that of the first engagement spring 85.

According to the seat slide apparatus for the vehicle in the third embodiment, the pair of lower rails 60 is assembled with the pair of upper rails 70, sliding retaining members 40, a pair of lock mechanisms 80, a pair of springs 87, and further a pair of handle attaching members 90, respectively. Then, both lower rails 60 are fixed to the floor 100 of the vehicle with a predetermined distance relative to each other. Afterward, both the lever portions 98 of the handle 95 are inserted into retaining hole 91a of the handle attaching members 90, respectively. When the second engagement springs 86 are inserted into the inserting grooves 98b of the lever portions 98 respectively, the handle 95 are operably connected to the handle attaching members 90 (to the upper rail 70) by the second engagement springs 86 and the handle 95 may not be disconnected from the handle attaching members 90. Further, the handle 95 is axially supported to be pivotable around connecting portions of the retaining holes 91a and lever portions 98.

Next, an operation of the seat slide apparatus for the vehicle according to the third embodiment will be briefly described hereinbelow. The biasing force of the first engagement spring 85 of each left and right lock mechanism 80 is larger than the biasing force of the second engagement spring 86 of the corresponding lock mechanism 80. Accordingly, when the handle 95 is not operated, the lock nails 81a of each locking lever 81 are engaged into the lock bores 63a formed at the inner second sidewall 65a of each lower rail 60, and the upper rail 70 is locked to the corresponding lower rail 60. Then, the lever portions 98 of the handle 95 are retained so as to be in contact with the interlocking portion 81b of the corresponding locking lever 81.

When an operator (a vehicle occupant) pulls the handle 95 up, the lever portions 98 are rotated around the retaining holes 91a of the retaining plate 91, respectively. Therefore, the interlocking portion 81b of each locking lever 81 is pressed by the pressing portion 98a of the lever portion 98. Then, the locking lever 81 is rotated around the pivotal axis 81e, and the lock nails 81a of each locking lever 81 are released from engaging with the lock bores 63a of the corresponding lower rail 60. Accordingly, the upper rail 70 is operated to be movable in front and rear directions of the seat slide apparatus for the vehicle.

When the operator releases the handle 95, the lock nails 81a of each locking lever 81 are engaged into the lock bores 63a of the corresponding lower rail 60, by the biasing force of the first engagement spring 85. Then, the upper rail 70 is locked to the corresponding lower rail 60 again. When force to lower the handle 95 is applied thereto, the lever portions 98 make a contact with the stoppers 91b of the handle attaching members 90 respectively and therefore, the lever portions 98 of the handle 95 are restrained from rotating in a direction to be away from the locking levers 81.

According to the seat slide apparatus for the vehicle in the third embodiment, the first engagement spring 85 and the second engagement spring 86 are integrally formed. Accordingly, there is no need to separately provide each first engagement spring 85 and each second engagement spring 86. Further, the first engagement spring 85 and the second engagement spring 86 are assembled to the seat slide apparatus in one operation. Therefore, according to the seat slide apparatus for the vehicle in the third embodiment, an amount of the components is reduced and the assembling procedure may be facilitated.

Further according to the seat slide apparatus for the vehicle in the third embodiment, the biasing force of the second engagement spring 86 is smaller than that of the first engagement spring 85. Accordingly, force for biasing the locking lever 81 in a direction where the lock bores 81a of the locking lever 81 are engaged into the lock bores 63a are greater than a force for biasing the locking lever 81 in a direction where the lock bores 81a are released from the lock bores 63a. Therefore, the locking lever 81 and the lock bores 63a formed at the lower rail 60 may be surely engaged with each other.

Still further according to the seat slide apparatus for the vehicle in the third embodiment, the stopper 91b, which restrains the position of the lever portion 98 moving away from the locking lever 81, is provided at the retaining plate 91. Accordingly, because of this simplified structure, the lever portion 98 is prevented from largely moving away from the locking lever 81 and therefore, the second engagement spring 86 is protected from being removed or being damaged. According to the seat slide apparatus in the third embodiment, the first engagement spring 85, which serves as the first biasing member, is integrally formed with the second engagement spring 86 which serves as the second biasing member and as the connecting member. However, the first biasing member and the connecting member may be integrally formed and the second biasing member may be separately formed.

According to each first, second and third embodiment of the seat side apparatus for the vehicle, the lock mechanisms 30/80 are provided at the right and left upper rails 20/70, respectively, and each lock mechanism 30/80 is provided with the spring 37/87, which is formed with the first engagement spring 35/85 integral with the second engagement spring 36/86. One of the springs 37/87 however may be formed with the first engagement spring 35/85 separated from the second engagement spring 36/86.

Further, according to each first, second and third embodiment, the lock mechanisms 30/80 are provided at the right and left upper rails 20/70. Alternatively, either right or left upper rail 20/70 may include the lock mechanism 30/80 having the spring 37/87 formed with the first engagement spring 35/85 integral with the second engagement spring 36/86.

According to the seat slide apparatus for the vehicle as described above, the seat slide apparatus includes a handle 50 for operating the releasing lever 45 against biasing force of the first engagement spring 35 and a biasing force of the second engagement spring 36. When the handle 50 is not operated, the releasing lever 45 is located at the neutral position.

Further according to the aforementioned seat slide apparatus for the vehicle, the first engagement spring 35 is formed integral with the second engagement spring 36, and both engagement springs 35 and 36 form a spring 37, which is mounted at the upper rail 10. An end of the spring 37 is operably connected to the locking lever 31 while the other end of the spring 37 is operably connected to the releasing lever 45.

Due to above-mentioned structure, the first biasing member (the engagement spring 35) is formed integral with the second biasing member (the engagement spring 36). Accordingly, there may be no need to separately provide each first biasing member and the second biasing member. Further, the first and the second engagement springs 85, 86 are assembled to the seat slide apparatus in one operation. Therefore, an amount of components may be reduced and the assembling procedure may be facilitated.

According to the seat slide apparatus for the vehicle as described above, the lower rail 10 includes the first lower rail 10 and the second lower rail 10, the upper rail 20 includes the first upper rail 20 and the second upper rail 20, and the spring 37 includes the first spring 37 and the second spring 37, both which are provided at the first and second upper rails 20, respectively.

Due to the above-mentioned structure, each first spring 37 and the second spring 37 is integrally formed with the first engagement spring 35 and the second engagement spring 36, and is provided at first and second upper rails 20, respectively. Accordingly, the amount of components may be reduced and the assembling procedure may be facilitated.

Further according to the aforementioned seat slide apparatus for the vehicle, the lower rail 10 includes the first lower rail 10 and the second lower rail 10, the upper rail 20 includes the first upper rail 20 and the second upper rail 20, and the spring 37 is provided at either the first upper rail 20 or the second upper rail 20.

Due to the above-mentioned structure, the spring 37, which is integrally formed with the first engagement spring 35 and the second engagement spring 36, is provided at either the first upper rail 20 or the second upper rail 20. Accordingly, the amount of components may be reduced and the assembling procedure may be facilitated.

Further according to the seat slide apparatus as described above, the biasing force of the second engagement spring 36 is smaller than the biasing force of the first engagement spring 35.

Due to the above-mentioned structure, the biasing force of the second engagement spring 36 is smaller than the biasing force of the first engagement spring 35. Accordingly, when the releasing lever 45 is biased in a direction where the releasing lever 45 is engaged with the locking lever 31 by the second engagement spring 36, the locking lever 31 and the lock bores 13a formed at the lower rail 10 may be surely engaged with each other. Further, when the releasing lever 45 is biased in a direction where the releasing lever 45 is moved to be away from the locking lever 31, the handle 50 may be operated with an adequate force.

Further according to the seat slide apparatus for the vehicle as described above, the locking lever 31 is formed with the interlocking portion 31b and the releasing lever 45 is formed with the pressing portion 45a. The interlocking portion 31b and the pressing portion 45a are in contact with each other when the releasing lever 45 is located at the neutral position.

Still further according to the aforementioned embodiment, the releasing lever 45 is provided with the stopper 46 for restraining the position of the releasing lever 45 against the biasing force of the second engagement spring 36, when the pressing portion 45a of the releasing lever 45 is distant from the interlocking portion 31b of the locking lever 31.

Due to the above-mentioned structure, the stopper 46 is integrally provided in order to restrain a position of the releasing lever 45. Accordingly, the releasing lever 45 is prevented from largely moving away from the locking lever 31 and therefore, the second engagement spring 36 is protected from being removed or being damaged.

Further according to the seat slide apparatus for the vehicle as described above, the locking lever 31 is formed with the interlocking portion 31b, and the releasing lever 45 is formed with the pressing portion 45a and the stopper 46, which is contactable with the upper rail 20. When the releasing lever 45 is located at the neutral position, the pressing portion 45a is distant from the interlocking portion 31b, and further, the stopper 46 is in contact with the upper rail 20.

Due to the above-mentioned structure, the stopper 46 is integrally provided in order to restrain a position of the releasing lever 45. Accordingly, the releasing lever 45 is prevented from largely moving away from the locking lever 31 and therefore, the second engagement spring 36 is protected from being removed or being damaged. Here, when the releasing lever 45 is biased in a direction where the releasing lever 45 is to be away from the locking member 31 by the second engagement spring 36, the releasing lever 45 is maintained to be located at the neutral position by the second engagement spring 36 and the stopper 46.

According to the seat slide apparatus as described above, the seat slide apparatus for the vehicle include the lower rail 60 which is fixedly mounted on the vehicle floor 100, the upper rail 70 which is secured to the seat 101 and supported by the lower rail 60 so as to be movable in front and rear directions of the lower rail 60, and the lock mechanism 80. The lock mechanism 80 includes the lock bores 63a as a lock portion provided at the lower rail 60, the locking lever 81 as a locking member provided at the upper rail 60 so as to be engageable with and disengageable from the lock bores 63a, and the first biasing member (first engagement spring 85) for biasing the locking lever 81 in a direction to be engaged with the lock bores 63. The aforementioned seat slide apparatus for the vehicle further includes the handle 95 for operating the locking lever 81 in order to release the locking lever 81 from being engaged with the lock bores 63a, and the connecting member which is integrally provided with the first biasing member for locking the handle 95 to the lower rail 60 or the upper rail 70.

Due to the above-mentioned structure, the first engagement spring 85 and the connecting member are integrally formed. Accordingly, the first engagement spring 85 and the connecting member are integrally formed. Accordingly, there may be no need to separately provide the first engagement spring 85 and the connecting member. Further, the first engagement spring 85 and the connecting member are assembled to the seat slide apparatus in one operation. Therefore, an amount of components may be reduced and the assembling procedure may be facilitated.

Further according to the seat slide apparatus as described above, the seat slide apparatus for the vehicle further includes the second biasing member (second engagement spring 86) for biasing the handle 95 and integrally formed with the first biasing member and the connecting member.

Still further according to the seat slide apparatus for the vehicle as described above, the first engagement spring 85, the second engagement spring 86 and the connecting member form the spring 87. The end of the spring 87 is operably connected to the locking lever 81 while the other end of the spring 87 is operably connected to the handle 95.

Due to the above-mentioned structure, the first engagement spring 85, the second engagement spring 86 and the connecting member are integrally formed. Accordingly, there may be no need to separately provide the first engagement spring 85, the second engagement spring 86 and the connecting member. Further, the first engagement spring 85, the second engagement spring 86 and the connecting member are assembled to the seat slide apparatus in one operation. Therefore, an amount of components may be reduced and the assembling procedure may be facilitated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
    a lower rail adapted to be fixedly mounted on a vehicle floor;
    an upper rail adapted to be coupled to a seat and supported on the lower rail so as to be movable in front and rear directions of the lower rail;
    a lock mechanism including a lock portion provided at the lower rail, a lock member pivotably supported to the upper rail so as to be engageable with and disengageable from the lock portion and a first biasing member for biasing the lock member in a direction to be engaged with the lock portion;
    a releasing lever for releasing the lock member from being engaged with the lock portion by pivoting the lock member;
    a second biasing member integrally provided with the first biasing member, the second biasing member maintaining the releasing lever at a neutral position,
    the first biasing member and the second biasing member comprise a spring mounted at the upper rail, and
    an end of the spring is operably connected to the lock member while the other end of the spring is operably connected to the releasing lever.

2. A seat slide apparatus for a vehicle according to claim 1, further comprising:
    a handle for operating the releasing lever against biasing force of the first biasing member and a biasing force of the second biasing member whereby the releasing lever is located at the neutral position when the handle is not operated.

3. A seat slide apparatus for a vehicle according to claim 1, wherein
    the lower rail includes a first lower rail and a second lower rail, the upper rail includes a first upper rail and a second upper rail and the spring includes a first spring and a second spring, and wherein
    the first spring and the second spring are provided at the first and the second upper rails respectively.

4. A seat slide apparatus for a vehicle according to claim 1, wherein
    the lower rail includes a first lower rail and a second lower rail, the upper rail includes a first upper rail and a second upper rail and wherein
    the spring is provided at either the first upper rail or the second upper rail.

5. A seat slide apparatus for a vehicle according to claim 1, wherein
    the biasing force of the second biasing member is smaller than the biasing force of the first biasing member.

6. A seat slide apparatus for a vehicle according to claim 1, wherein
    the lock member includes a interlocking portion, the releasing lever includes a pressing portion, and wherein
    the interlocking portion and the pressing portion are in contact with each other when the releasing lever is located at the neutral position.

7. A seat slide apparatus for a vehicle according to claim 6, wherein
    the releasing lever is provided with a stopper for restraining a position of the releasing lever against the biasing force of the second biasing member when the pressing portion of the releasing lever is distant from the interlocking portion of the lock member.

8. A seat slide apparatus for a vehicle according to claim 1, wherein
the lock member includes an interlocking portion, the releasing lever includes a pressing portion and a stopper being contactable with the upper rail, and the releasing lever is located at the neutral position with the pressing portion being distant from the interlocking portion and with the stopper being in contact with the upper rail.

9. A seat slide apparatus for a vehicle, comprising:
a lower rail adapted to be fixedly mounted on a vehicle floor;
an upper rail adapted to be coupled to a seat and supported on the lower rail so as to be movable in front and rear directions of the lower rail;
a lock mechanism including a lock portion provided at the lower rail, a lock member provided at the upper rail so as to be engageable with and disengageable from the lock portion, and a first biasing member that biases the lock member in a direction to be engaged with the lock portions;
a handle that operates the lock member in order to release the lock member from being engaged with the lock portion; and
a connecting member integrally provided with the first biasing member to lock the handle to the lower rail or the upper rail,
a second biasing member that biases the handle and integrally formed with the first biasing member and the connecting member, wherein
the first biasing member, the second biasing member and the connecting member comprise a spring, and an end of the spring is operably connected to the lock member while the other end of the spring is operably connected to the handle.

10. A seat slide apparatus for a vehicle according to claim 9, wherein
the lower rail includes a first lower rail and a second lower rail, the upper rail includes a first upper rail and a second upper rail and the spring includes a first spring and a second spring, and wherein the first spring and the second spring are provided at the first and the second upper rails respectively.

11. A seat slide apparatus for a vehicle according to claim 9, wherein
the lower rail includes a first lower rail and a second lower rail, the upper rail includes a first upper rail and a second upper rail, and wherein the spring is provided at either one of the first upper rail or the second upper rail.

12. A seat slide apparatus for a vehicle, comprising:
a lower rail adapted to be fixedly mounted on a vehicle floor;
an upper rail adapted to be coupled to a seat and supported on the lower rail so as to be movable in front and rear directions of the lower rail;
a lock mechanism including a lock portion provided at the lower rail, a lock member provided at the upper rail so as to be engageable with and disengageable from the lock portion, and a first biasing member that biases the lock member in a direction to be engaged with the lock portions;
a handle that operates the lock member in order to release the lock member from being engaged with the lock portion; and
a connecting member integrally provided with the first biasing member to lock the handle to the lower rail or the upper rail, wherein
the biasing force of the second biasing member is smaller than the biasing force of the first biasing member.

* * * * *